(12) United States Patent
McCabe et al.

(10) Patent No.: US 9,251,131 B2
(45) Date of Patent: Feb. 2, 2016

(54) SYSTEMS AND METHODS FOR DISTRIBUTED ELECTRONIC SIGNATURE DOCUMENTS INCLUDING VERSION CONTROL

(75) Inventors: Andrew David McCabe, Indianola, WA (US); Thomas H. Gosner, Jr., Bellevue, WA (US)

(73) Assignee: DocuSign, Inc., Seattle, WA (US)

( * ) Notice: Subject to any disclaimer, the term of this patent is extended or adjusted under 35 U.S.C. 154(b) by 155 days.

(21) Appl. No.: 12/773,720

(22) Filed: May 4, 2010

(65) Prior Publication Data
US 2011/0276875 A1  Nov. 10, 2011

(51) Int. Cl.
| G06F 17/00 | (2006.01) |
|---|---|
| G06F 17/24 | (2006.01) |
| G06Q 10/10 | (2012.01) |
| G06F 17/22 | (2006.01) |

(52) U.S. Cl.
CPC .......... *G06F 17/243* (2013.01); *G06F 17/2288* (2013.01); *G06Q 10/10* (2013.01)

(58) Field of Classification Search
CPC .................................................... H04L 9/3281
See application file for complete search history.

(56) References Cited

U.S. PATENT DOCUMENTS

| 5,005,200 A | 4/1991 | Fischer |
|---|---|---|
| 5,040,142 A | 8/1991 | Mori et al. |
| 5,220,675 A | 6/1993 | Padawer et al. |
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |

(Continued)

FOREIGN PATENT DOCUMENTS

| CN | 101124766 A | 2/2008 |
|---|---|---|
| CN | 101299256 | 11/2008 |

(Continued)

OTHER PUBLICATIONS

Wheeler et al., "DocuSign Unveils new Scalable Product and Support Offerings of Electronic Signature and Electronic Contract Execution," DocuSign the fastest way to get a signature, 2 pp., Jan. 2008.

(Continued)

*Primary Examiner* — Scott Baderman
*Assistant Examiner* — Mustafa Amin
(74) *Attorney, Agent, or Firm* — Schwegman Lundberg & Woessner, P.A.

(57) ABSTRACT

Systems and methods for facilitating version control over an electronic document, the electronic document being subject to a distribution sequence among at least first and second reviewing parties over a network. The method includes receiving an instruction set from a source client. Based on the instruction set, at least one editable field populated with content is embedded in the electronic document. The progress of the electronic document through the distribution sequence is monitored over the network. The content of the editable field being edited by the first reviewing party is determined. In response to determining that the content has been edited by the first reviewing party, the edited electronic document is provided to the second reviewing party. The electronic document being electronically signed by the first and second reviewing parties is validated. The editable field is locked from further electronic editing.

19 Claims, 4 Drawing Sheets

(56) References Cited

U.S. PATENT DOCUMENTS

| | | |
|---|---|---|
| 5,553,145 A | 9/1996 | Micali |
| 5,615,268 A | 3/1997 | Bisbee et al. |
| 5,629,982 A | 5/1997 | Micali |
| 5,689,567 A | 11/1997 | Miyauchi |
| 5,748,738 A | 5/1998 | Bisbee et al. |
| 5,813,009 A | 9/1998 | Johnson et al. |
| 5,832,499 A | 11/1998 | Gustman |
| 5,872,848 A | 2/1999 | Romney et al. |
| 5,898,156 A | 4/1999 | Wilfong |
| 6,021,202 A | 2/2000 | Anderson et al. |
| 6,067,531 A | 5/2000 | Hoyt et al. |
| 6,085,322 A | 7/2000 | Romney et al. |
| 6,092,080 A | 7/2000 | Gustman |
| 6,119,229 A | 9/2000 | Martinez et al. |
| 6,128,740 A | 10/2000 | Curry et al. |
| 6,161,139 A | 12/2000 | Win et al. |
| 6,185,587 B1 | 2/2001 | Bernardo et al. |
| 6,185,683 B1 | 2/2001 | Ginter et al. |
| 6,199,052 B1 | 3/2001 | Mitty et al. |
| 6,210,276 B1 | 4/2001 | Mullins |
| 6,237,096 B1 | 5/2001 | Bisbee et al. |
| 6,289,460 B1 | 9/2001 | Hajmiragha |
| 6,321,333 B1 | 11/2001 | Murray |
| 6,327,656 B2 | 12/2001 | Zabetian |
| 6,367,010 B1 | 4/2002 | Venkatram et al. |
| 6,367,013 B1 | 4/2002 | Bisbee et al. |
| 6,446,115 B2 | 9/2002 | Powers |
| 6,470,448 B1 | 10/2002 | Kuroda et al. |
| 6,584,466 B1 | 6/2003 | Serbinis et al. |
| 6,615,348 B1 | 9/2003 | Gibbs |
| 6,631,200 B1 * | 10/2003 | Savoray et al. ............... 382/119 |
| 6,658,403 B1 | 12/2003 | Kuroda et al. |
| 6,671,805 B1 | 12/2003 | Brown et al. |
| 6,728,762 B1 | 4/2004 | Estrada et al. |
| 6,751,632 B1 | 6/2004 | Petrogiannis |
| 6,754,829 B1 | 6/2004 | Butt et al. |
| 6,796,489 B2 | 9/2004 | Slater et al. |
| 6,807,633 B1 | 10/2004 | Pavlik |
| 6,829,635 B1 | 12/2004 | Townshend |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,959,382 B1 | 10/2005 | Kinnis et al. |
| 6,961,854 B2 | 11/2005 | Serret-Avila et al. |
| 6,973,569 B1 | 12/2005 | Anderson et al. |
| 6,990,684 B2 | 1/2006 | Futamura et al. |
| 7,039,805 B1 | 5/2006 | Messing |
| 7,059,516 B2 | 6/2006 | Matsuyama et al. |
| 7,069,443 B2 | 6/2006 | Berringer et al. |
| 7,093,130 B1 | 8/2006 | Kobayashi et al. |
| 7,100,045 B2 | 8/2006 | Yamada et al. |
| 7,103,778 B2 | 9/2006 | Kon et al. |
| 7,162,635 B2 | 1/2007 | Bisbee et al. |
| 7,167,844 B1 | 1/2007 | Leong et al. |
| 7,197,644 B2 | 3/2007 | Brewington |
| 7,237,114 B1 | 6/2007 | Rosenberg |
| 7,340,608 B2 | 3/2008 | Laurie et al. |
| 7,360,079 B2 | 4/2008 | Wall |
| 7,395,436 B1 | 7/2008 | Nemovicher |
| 7,424,543 B2 | 9/2008 | Rice, III |
| 7,437,421 B2 | 10/2008 | Bhogal et al. |
| 7,523,315 B2 | 4/2009 | Hougaard et al. |
| 7,533,268 B1 | 5/2009 | Catorcini et al. |
| 7,554,576 B2 | 6/2009 | Erol et al. |
| 7,562,053 B2 | 7/2009 | Twining et al. |
| 7,562,215 B2 * | 7/2009 | Cummins ............... G06Q 10/10 713/165 |
| 7,568,101 B1 | 7/2009 | Catorcini et al. |
| 7,568,104 B2 | 7/2009 | Berryman et al. |
| 7,581,105 B2 | 8/2009 | Dietl |
| 7,657,832 B1 | 2/2010 | Lin |
| 7,660,863 B2 | 2/2010 | De Boursetty et al. |
| 7,788,259 B2 | 8/2010 | Patterson et al. |
| 7,900,050 B2 | 3/2011 | Izu et al. |
| 7,934,098 B1 | 4/2011 | Hahn et al. |
| 7,953,977 B2 | 5/2011 | Maruyama et al. |
| 8,103,867 B2 | 1/2012 | Spitz |
| 8,132,013 B2 | 3/2012 | Meier |
| 8,205,151 B2 | 6/2012 | Smith |
| 8,286,071 B1 | 10/2012 | Zimmerman et al. |
| 8,588,483 B2 | 11/2013 | Hicks et al. |
| 8,612,349 B1 | 12/2013 | Ledder et al. |
| 2001/0018739 A1 | 8/2001 | Anderson et al. |
| 2001/0034739 A1 | 10/2001 | Anecki et al. |
| 2001/0034835 A1 | 10/2001 | Smith |
| 2002/0004800 A1 | 1/2002 | Kikuta et al. |
| 2002/0019937 A1 | 2/2002 | Edstrom et al. |
| 2002/0026427 A1 | 2/2002 | Kon et al. |
| 2002/0026582 A1 | 2/2002 | Futamura et al. |
| 2002/0040431 A1 | 4/2002 | Kato et al. |
| 2002/0049906 A1 | 4/2002 | Maruyama et al. |
| 2002/0069179 A1 | 6/2002 | Slater et al. |
| 2002/0069358 A1 | 6/2002 | Silvester |
| 2002/0129056 A1 | 9/2002 | Conant et al. |
| 2002/0138445 A1 | 9/2002 | Laage et al. |
| 2002/0143711 A1 | 10/2002 | Nassiri |
| 2002/0162000 A1 | 10/2002 | Bensler |
| 2002/0178187 A1 | 11/2002 | Rasmussen et al. |
| 2002/0184485 A1 | 12/2002 | Dray et al. |
| 2002/0194219 A1 | 12/2002 | Bradley et al. |
| 2002/0196478 A1 | 12/2002 | Struble |
| 2003/0048301 A1 | 3/2003 | Menninger |
| 2003/0051016 A1 | 3/2003 | Miyoshi et al. |
| 2003/0078880 A1 * | 4/2003 | Alley et al. ............... 705/38 |
| 2003/0120553 A1 | 6/2003 | Williams |
| 2003/0120930 A1 | 6/2003 | Simpson et al. |
| 2003/0131073 A1 | 7/2003 | Lucovsky et al. |
| 2003/0140252 A1 | 7/2003 | Lafon et al. |
| 2003/0217275 A1 | 11/2003 | Bentley et al. |
| 2004/0054606 A1 * | 3/2004 | Broerman ............... 705/27 |
| 2004/0078337 A1 | 4/2004 | King et al. |
| 2004/0107352 A1 | 6/2004 | Yui et al. |
| 2004/0117280 A1 | 6/2004 | Klee et al. |
| 2004/0117627 A1 | 6/2004 | Brewington |
| 2004/0133493 A1 | 7/2004 | Ford et al. |
| 2004/0181756 A1 | 9/2004 | Berringer et al. |
| 2004/0225884 A1 | 11/2004 | Lorenzini et al. |
| 2004/0230891 A1 | 11/2004 | Pravetz et al. |
| 2004/0250070 A1 | 12/2004 | Wong |
| 2004/0255114 A1 | 12/2004 | Lee et al. |
| 2004/0255127 A1 | 12/2004 | Arnouse |
| 2005/0033811 A1 * | 2/2005 | Bhogal et al. ............... 709/206 |
| 2005/0049903 A1 | 3/2005 | Raja |
| 2005/0076215 A1 * | 4/2005 | Dryer ............... 713/170 |
| 2005/0091143 A1 * | 4/2005 | Schmidt et al. ............... 705/37 |
| 2005/0120217 A1 | 6/2005 | Fifield et al. |
| 2005/0165626 A1 | 7/2005 | Karpf |
| 2005/0177734 A1 | 8/2005 | Tanimoto et al. |
| 2005/0182684 A1 * | 8/2005 | Dawson et al. ............... 705/26 |
| 2005/0182956 A1 | 8/2005 | Ginter et al. |
| 2005/0192908 A1 | 9/2005 | Jorimann et al. |
| 2005/0231738 A1 | 10/2005 | Huff et al. |
| 2006/0047600 A1 | 3/2006 | Bodenheim et al. |
| 2006/0161780 A1 | 7/2006 | Berryman et al. |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0026927 A1 | 2/2007 | Yaldoo et al. |
| 2007/0079139 A1 | 4/2007 | Kim |
| 2007/0088958 A1 | 4/2007 | Qa'Im-maqami |
| 2007/0094510 A1 | 4/2007 | Ross et al. |
| 2007/0118732 A1 * | 5/2007 | Whitmore ............... 713/155 |
| 2007/0130186 A1 | 6/2007 | Ramsey et al. |
| 2007/0136361 A1 | 6/2007 | Lee et al. |
| 2007/0143085 A1 * | 6/2007 | Kimmel ............... 703/3 |
| 2007/0165865 A1 | 7/2007 | Talvitie |
| 2007/0168671 A1 | 7/2007 | Takenaka et al. |
| 2007/0198533 A1 * | 8/2007 | Foygel et al. ............... 707/10 |
| 2007/0208944 A1 | 9/2007 | Pavlicic |

(56) References Cited

U.S. PATENT DOCUMENTS

| | | |
|---|---|---|
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0097777 A1 | 4/2008 | Rielo |
| 2008/0141033 A1 | 6/2008 | Ginter et al. |
| 2008/0209313 A1* | 8/2008 | Gonser ............ 715/255 |
| 2008/0209516 A1 | 8/2008 | Nassiri |
| 2008/0216147 A1 | 9/2008 | Duffy |
| 2008/0235221 A1 | 9/2008 | Burns et al. |
| 2008/0235577 A1 | 9/2008 | Veluchamy et al. |
| 2008/0260287 A1 | 10/2008 | Berryman et al. |
| 2008/0313723 A1 | 12/2008 | Naono et al. |
| 2009/0024912 A1* | 1/2009 | McCabe et al. ............ 715/224 |
| 2009/0025087 A1* | 1/2009 | Peirson et al. ............ 726/27 |
| 2009/0044019 A1 | 2/2009 | Lee et al. |
| 2009/0076960 A2 | 3/2009 | Hamel et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0158043 A1 | 6/2009 | Boyer et al. |
| 2009/0185241 A1 | 7/2009 | Nepomniachtchi |
| 2009/0268903 A1 | 10/2009 | Bojinov et al. |
| 2009/0287697 A1 | 11/2009 | Minogue et al. |
| 2009/0292786 A1 | 11/2009 | McCabe et al. |
| 2010/0037062 A1 | 2/2010 | Carney |
| 2010/0088364 A1 | 4/2010 | Carter et al. |
| 2010/0100743 A1 | 4/2010 | Ali et al. |
| 2010/0122304 A1 | 5/2010 | Shima |
| 2010/0128291 A1 | 5/2010 | Vendrow et al. |
| 2010/0153011 A1 | 6/2010 | Obrea et al. |
| 2010/0217987 A1* | 8/2010 | Shevade ............ 713/175 |
| 2010/0217996 A1 | 8/2010 | Ross et al. |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0119165 A1 | 5/2011 | Zee |
| 2011/0126022 A1 | 5/2011 | Sieberer |
| 2011/0225501 A1 | 9/2011 | Uchida et al. |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 7/2013 | Hamid |
| 2013/0212404 A1 | 8/2013 | Pravetz et al. |
| 2013/0254111 A1 | 9/2013 | Gonser et al. |
| 2013/0263283 A1 | 10/2013 | Peterson et al. |
| 2014/0019761 A1 | 1/2014 | Shapiro |
| 2015/0143219 A1 | 5/2015 | McCabe et al. |

FOREIGN PATENT DOCUMENTS

| | | |
|---|---|---|
| CN | 101427242 A | 5/2009 |
| EP | 1238321 | 6/2001 |
| JP | 2000048072 | 2/2000 |
| JP | 2002366749 A | 12/2002 |
| JP | 2003271529 | 9/2003 |
| JP | 2005267438 | 9/2005 |
| JP | 2005309973 A | 11/2005 |
| JP | 2006343906 A | 12/2006 |
| JP | 2008117258 | 5/2008 |
| JP | 2008225527 | 9/2008 |
| JP | 2009503736 A | 1/2009 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| WO | 9607156 | 3/1996 |
| WO | 03091834 | 11/2003 |
| WO | WO-03091834 A2 | 11/2003 |
| WO | 2007075235 | 7/2007 |
| WO | 2008124627 | 10/2008 |
| WO | 2009012478 | 1/2009 |
| WO | 2010105262 | 9/2010 |
| WO | WO-2011139563 | 11/2011 |

OTHER PUBLICATIONS

Borozdin, "DocuSign Connect Service Guide," DocuSign, Inc., pp. 1-9, 2008.

"eLynx Adds Workflow Management to Electronic Document Platform-new Workflow Capabilities Provide for Enhanced Electronic Loan Processing," eLynx, http://www.elynx.com/news/view/82, 2 pp., Jan. 2009.

Kamara et al., "Cryptographic Cloud Storage", 2010, Financial Cryptography and Data Security, p. 136-149.

Zefferer et al., "An Electronic-Signature Based Circular Resolution Database System," Mar. 2010, ACM, p. 1840-1845.

Su et al., "Signature-In-Signature Verification Via a Secure Simple Network Protocol", 2010, IEEE, p. 1-4.

Laurens Leurs; The history of PDF; Feb. 14, 2010; Prepressure.com; pp. 1-12.

Brown, "Digital Signatures: Can They be Accepted as Legal Signatures in EID?", Dec. 1993, ACM, p. 86-92.

Herzberg et al., "Surf'N'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

Harold, Elliotte Rusty, XML Bible. IDG Books Worldwide, Inc., 1999, p. 191-192.

"U.S. Appl. No. 14/610,672, Non Final Office Action mailed Jul. 2, 2015", 25 pgs.

"Australian Application Serial No. 2011248761, First Examiner Report mailed Sep. 22, 2014", 3 pgs.

"Chinese Application Serial No. 201180033239.3, Office Action mailed Dec. 29, 2014", with English translation of claims, 38 pgs.

"European Application Serial No. 11777833.2, Examination Notification Art. 94(3) mailed Jun. 19, 2015", 9 pgs.

"European Application Serial No. 11777833.2, Extended European Search Report mailed Mar. 12, 2014", 7 pgs.

"European Application Serial No. 11777833.2, Office Action mailed Dec. 20, 2012", 2 pgs.

"European Application Serial No. 11777833.2, Response filed Oct. 7, 2014 to Extended European Search Report mailed Mar. 12, 2014", 18 pgs.

"International Application Serial No. PCT/US2011/033194, International Preliminary Report on Patentability mailed Nov. 15, 2012", 6 pgs.

"International Application Serial No. PCT/US2011/033194, International Search Report mailed Nov. 28, 2011", 3 pgs.

"International Application Serial No. PCT/US2011/033194, Written Opinion mailed Nov. 28, 2011", 4 pgs.

"Japanese Application Serial No. 2013-509096, Office Action mailed Jan. 13, 2015", with English translation of claims, 6 pgs.

\* cited by examiner

FIG. 3

SYSTEMS AND METHODS FOR DISTRIBUTED ELECTRONIC SIGNATURE DOCUMENTS INCLUDING VERSION CONTROL

BACKGROUND OF THE INVENTION

The traditional process of negotiating and executing a written contract is familiar to many. In this process, the contract document is circulated among the parties, often several times, for their review, modification and signature. During the course of the document's circulation, one or more of the parties may suggest handwritten modifications to the contract terms and affix their handwritten initials proximal to such modifications to indicate their assent thereto.

Frequently, however, because of poor handwriting or ink blurring, it becomes difficult for the parties to discern the intelligibility of the handwritten terms and/or the identity of the initialing party. Additionally, it may prove difficult to discern whether such handwritten modifications were made subsequent to one or more of the parties having finally executed the contract document, believing the contract's terms to be settled.

SUMMARY OF THE INVENTION

Systems and methods are disclosed for facilitating version control over an electronic document, the electronic document being subject to a distribution sequence among at least first and second reviewing parties over a network. The method includes receiving an instruction set from a source client. Based on the instruction set, at least one editable field populated with content is embedded in the electronic document. The progress of the electronic document through the distribution sequence is monitored over the network. The content of the editable field being edited by the first reviewing party is determined. In response to determining that the content has been edited by the first reviewing party, the edited electronic document is provided to the second reviewing party. The electronic document being electronically signed by the first and second reviewing parties is validated. The editable field is locked from further electronic editing.

BRIEF DESCRIPTION OF THE DRAWINGS

The preferred and alternative embodiments of the present invention are described in detail below with reference to the following drawings:

FIG. 3 shows a user interface for customizing electronic documents according to an embodiment.

DETAILED DESCRIPTION OF THE PREFERRED EMBODIMENT

Embodiments of the invention may be described in the general context of, or may be implemented by, computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may incorporate concepts described in commonly owned U.S. patent application Ser. No. 12/038,728 entitled "SYSTEM AND METHOD FOR DOCUMENT TAGGING TEMPLATES," and U.S. patent application Ser. No. 12/490,602 entitled "SYSTEMS AND METHODS FOR DISTRIBUTED ELECTRONIC SIGNATURE DOCUMENTS," which are hereby incorporated by reference as if fully set forth herein.

Figure 1:
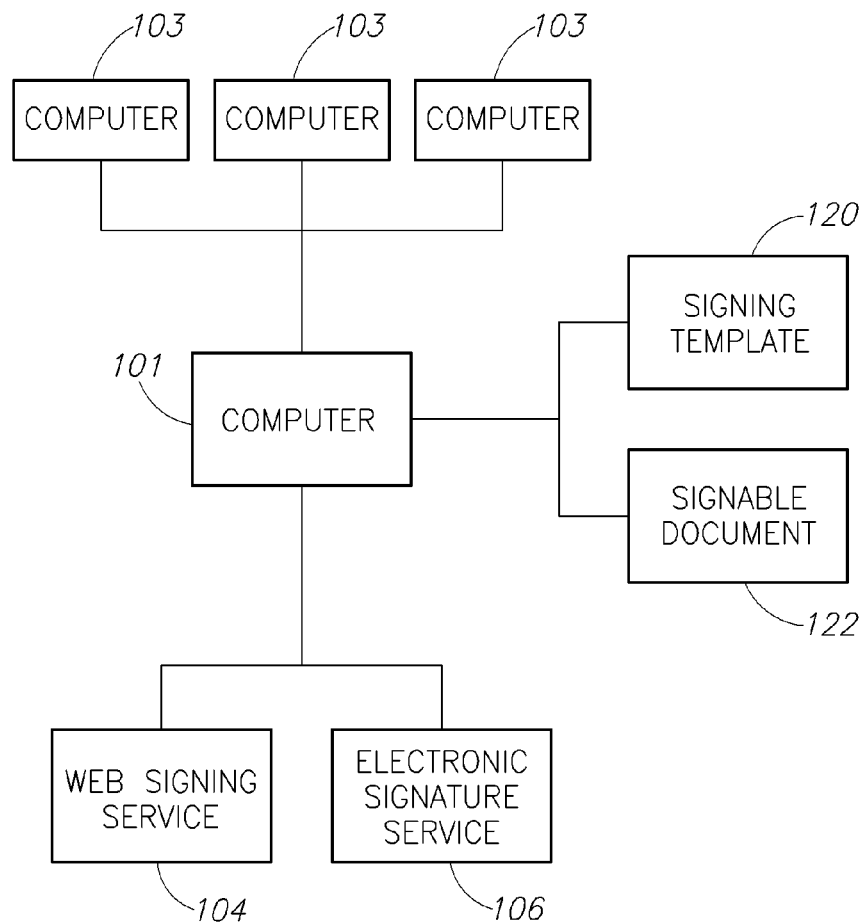
FIG. 1 shows an exemplary system for creation, processing and execution of distributed electronic signature documents.

FIG. 1 shows an example system 100 for creation, processing and execution of distributed electronic signature documents. The system 100 includes a single computer 101, or includes a computer 101 in communication with pluralities of other computers 103. The computer 101 is connected with a web signing service 104 and an electronic signature service 106 over a network such as the Internet. In one embodiment, a bank of servers, a wireless device, a cellular telephone and/or other data capture/entry device can be used in place of the computer 101. An application program, such as a source-client application, is run by the computer 101, which then creates a signing template 120 and/or a signable document 122. The computer 101 can include an application program that allows the signing template 120 and/or the signable document 122 to be sent for signature via email.

The signing template 120 is a file that preferably contains information about the signing process, locations, sequence and authentication. It contains linkages to any form fields in the signable document that will be used to fully execute the signing template. It may also contain information about the account holder and any limitations on the signing process. It may identify other parties that will also sign, as well as authentication requirements for any of the signers. The signable document 122 is a document file that preferably contains text and/or graphics along with a customizable control or link (e.g., tag) back to the signing template for execution. The web signing server 104 is a web server on the Internet that preferably hosts the application logic to correlate data transmitted by the embedded control in the signable document 122 with signing template 120 rule sets. An electronic signature service 106, such as the existing DocuSign service, executes the signing template instructions through the web signing server.

Figure 2:
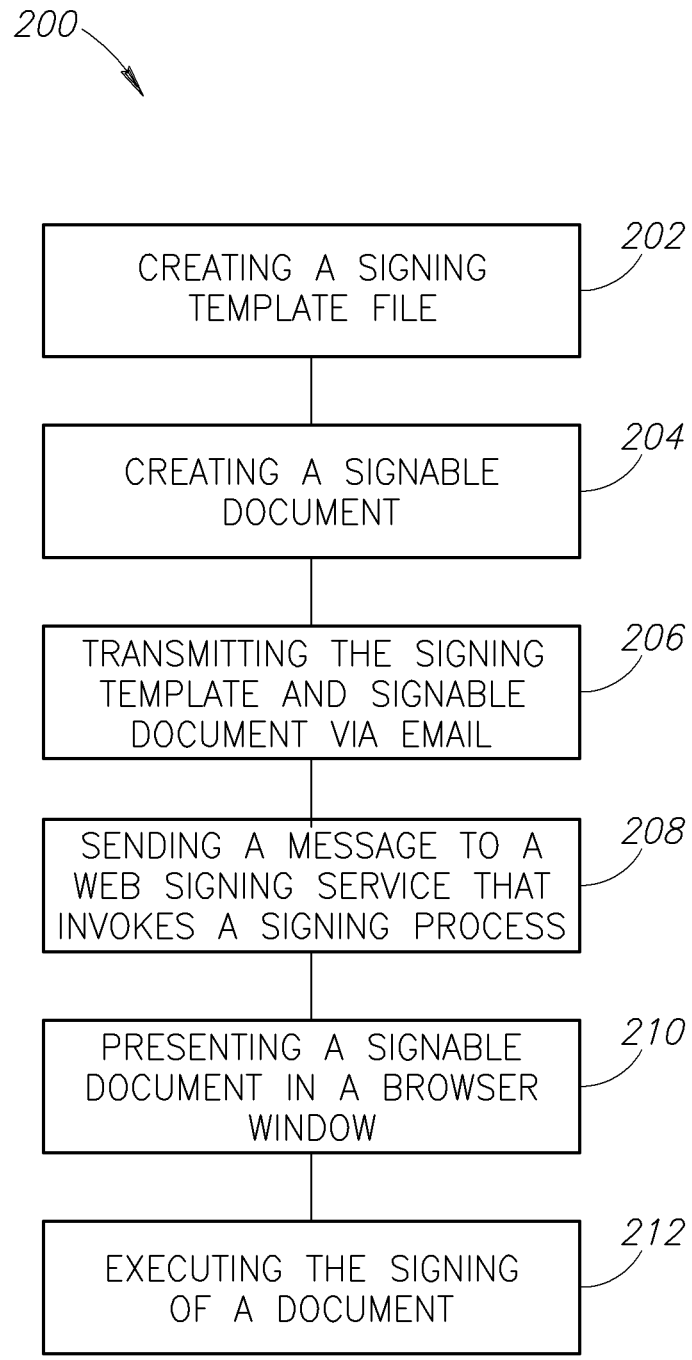
FIG. 2 shows a preferred method for distributed electronic signature documents.

FIG. 2 shows a method for distributed electronic signature documents 200 in one embodiment. At block 202 a document originator creates a signing template file that contains information about how a signable document is to be signed. A document originator may be a user, a party to a transaction, an agency or any entity interested in creating a signable document. The signing template file may include but is not limited to the location of signatures and initials for one or more signers; linkage between form fields in the actual document; information to be used to notify or authenticate the signer; information that may be used by decision systems to decide on different signature execution processes based on what is entered into the document during the signing process; the number of times the signable document can be executed; who will pay for the signature process; information governing whether the signable document content is modifiable by the signer; and other controlling information that may be changed or modified at any time by the sender who has access to it on the web server connected to the Internet. The signing template is preferably stored on a web signing server that is connected to the Internet.

In one embodiment, at block 204, the document originator may create a signable document that is to be distributed to recipients for signing or viewing. The creation of the signing template and signable document preferably occurs in the same application, but may also occur in a different sequence and in different applications. The core signable document preferably includes an embedded control that provides information about the companion signing template. This information is similar to a secure hyperlink that enables the signer to click a button ("SDButton") or a link in the signable document that contains information about how to connect over the Internet to the signing template for processing. The signable document is preferably paired with a signing template; however, there may be multiple signable documents relating back to one or more signable templates.

The document originator, at block 206, transmits electronically the signing template and signable document to the signer. In an alternative embodiment, the signing template may be distributed via a simple hyperlink back to the signable document stored on a web server available to the Internet. When the signer is ready and when the SDButton is activated, at block 208, a message is sent to the signing template on the web signing server, which invokes a signing process. This signing process preferably launches a procedure that validates the transaction and uploads the data provided by any form fields in the signable document to the web signing server and invokes a signing process that spawns a local web browser on the signer's computer and begins a signing process as defined by the signing template.

After the signer has been authenticated by the system by any means defined in the signing template, at block 210 a version of the signable document that is created from the server is presented in the browser window. The signing process uses the current method of signing found in the DocuSign service, but may accommodate alternative methods of signing found in similar services. At block 212, the signer signs the document.

Preferably only the form field data from the signer is uploaded to the server and merged into the signing template (which contains the signable document copy). In this embodiment, the signers are not able to modify the underlying documents because this data is not used when the contract is presented to them during the signing process.

In an alternative embodiment, if the sender allows the content to be modified prior to submitting to the web signing server for signing, the entire signable document rather than only the field information is uploaded to the web signing server for handling through the signing process. In this embodiment, the modified document is displayed for the signer to sign in the web signing server.

In another embodiment, the sender does not allow the content to be modified and the entire document is posted to the web signing server for the signing process. Next, a document integrity validation occurs on the posted document to ensure that the underlying content has not been changed.

Once a signable document/signing template pairing has been created, the signable document can be used in many different ways to enable businesses to easily allow electronic signatures to be collected. The following provide non-limiting examples of alternative embodiments as may be desired or dictated by application requirements.

In one example, a business creates a signable document for the company 401k signing sheet and emails it to multiple employees. Each employee opens the file and fills in the form, clicking a button that may say "Sign." The web signing server responds by presenting a web interface that authenticates and presents the document for signature for each employee and collects the signature and any data provided.

In another example, a business creates a signable document for a sales order form and creates the companion signing template, which requests that after the original signer has signed the document must be countersigned internally by two other people before being completed. To execute a sales transaction, the sales representative opens the document, enters in the data required for the sale, and sends the file to the signer for signature. The signer merely clicks the "Sign" button. The web signing server responds by presenting a web interface that authenticates and provides the document for signature to the first signer. Once the first signer has signed, the document is routed to the other two signers for signatures before it is completed.

A business creates a signable document that is unlocked (i.e. the content is changeable) for the company consulting agreement, and a signing template with instructions about the signing process, which ensures the company signer signs second. This contract is edited by both the company and consultant several times before it is deemed to be the final copy. Once the final copy is reached, either party may click the "Submit for Signature" link or button and the web signing server manages the signing process.

A company has an "Account Setup Form" that currently prospects download, print and fill out manually, and faxing the form back to the company for account setup. Using the systems and methods described herein, the sender company creates the form as a signable document linked to a signing template that defines the signing process for opening an account. When the user clicks on a hyperlink on a web page that says "Open Account," the form is displayed in the browser window, and the user fills out the form using all form fields defined in the signable document (for example a PDF form). When the user clicks "Sign" the web signing server executes the signing process for the document.

Embodiments of the invention include systems and methods for facilitating version control over an electronic document, the electronic document being subject to a distribution sequence among at least first and second reviewing parties over a network. Elements of the system 100 may include one or more computer-readable media having stored thereon instructions that, when executed by one or more elements of system 100, enable such elements to implement the described embodiments.

In an embodiment, a user desiring to create or otherwise format a document to be subject to a distribution sequence among a number of parties to review and execute the document may use a browser or desktop application associated with computer 101, for example, to access a document formatting service, which may be maintained by the administrator of web signing server 104 and/or electronic signature service 106. For example, the user may access a website maintained by such administrator and provide authentication information identifying the user in order to access previously stored base documents and/or provide base documents for formatting.

Figure 3:
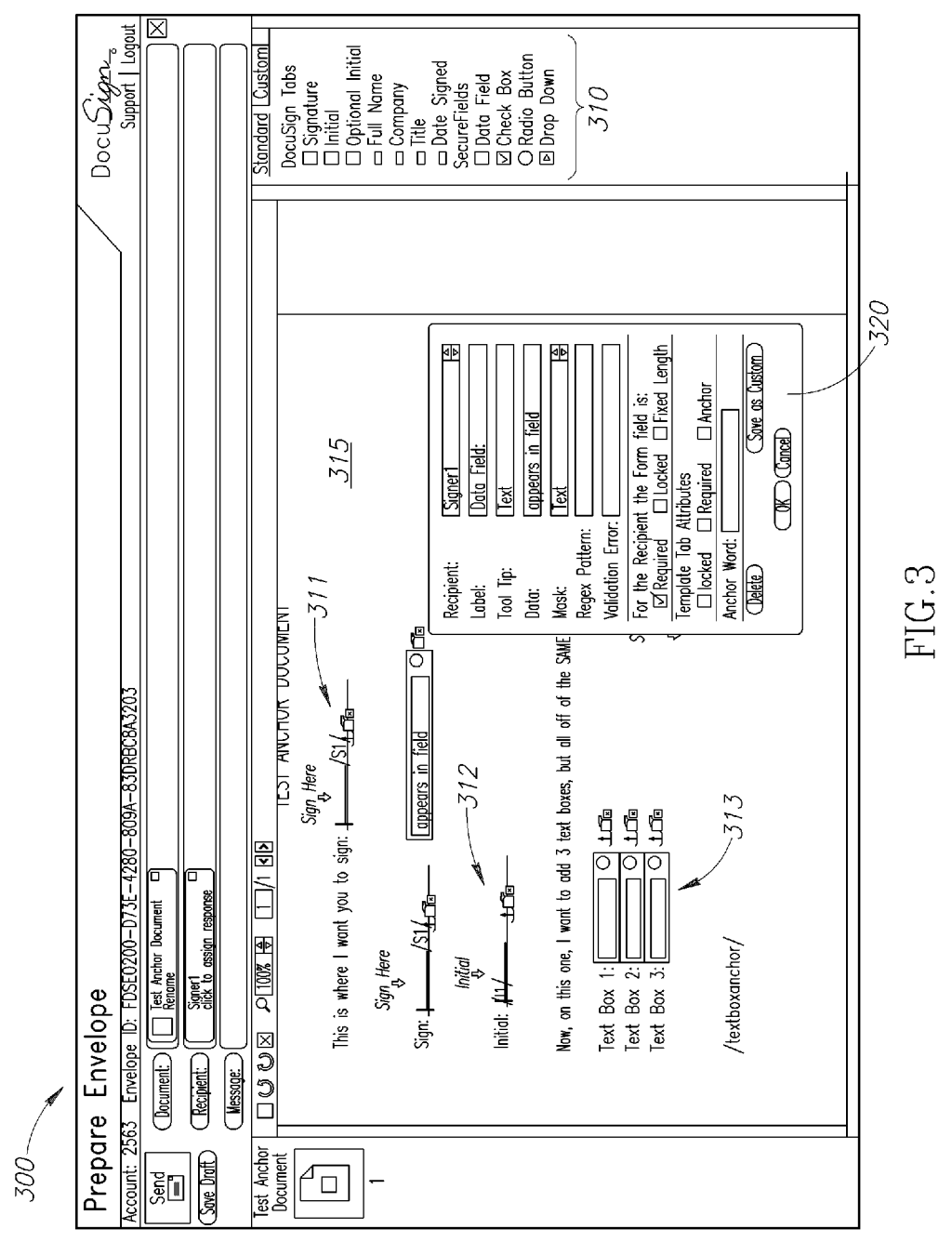

Upon accessing the site, and as illustrated in FIG. 3, the administrator may provide to the computer 101 a web page 300 or other content providing a graphical user interface allowing the user to customize, including establishing rules for, a document for circulation among prospective reviewers/signatories. As illustrated in FIG. 3, the page 300 includes a region 310 from which the user may select from among a number of overlay fields/tags (e.g., electronic signature fields 311, electronic initial fields 312, electronically editable data fields 313, etc.) to be embedded into, or otherwise associated with, an electronic document 315. As discussed elsewhere herein, these fields/tags may function as activatable controls, such that the selection, electronic signing, or modification of the field/tag by a reviewer/signatory can be detected by the web signing server 104 and/or electronic signature service 106. The electronic document 315 may be a document previously stored in, or uploaded to, a memory device accessible to the web signing server 104 and/or electronic signature service 106. The electronic document 315 may be of any conventional format (e.g., .pdf, Microsoft® Word, etc.)

As further illustrated in FIG. 3, upon selection of a field/tag from the region 310, the page 300 includes a dialog box 320 allowing the user to select from among, or otherwise establish, a number of parameters associated with the selected field/tag. For example, the user may designate the field as being uniquely usable, editable and/or viewable by a particular reviewer/signatory or set of reviewers/signatories. Consequently, and as discussed in greater detail herein, the web signing server 104 and/or electronic signature service 106 is able to track the actions of each reviewer/signatory as indicated by actions taken with respect to a corresponding field/tag. Additionally, the user may select, or otherwise provide, one or more blocks of text (e.g., contract language to be negotiated) in the document 315 as being editable, and may further designate one or more reviewers/signatories as being exclusively able to modify such editable text block(s). For example, if the document 315 includes pre-existing text, the user may, in a conventional manner, point and drag a cursor to select one or more blocks of text to be designated as editable by one or more reviewers/signatories. Alternatively, the user may embed into the document 315 an editable data field 313 and subsequently enter editable text or other content into such field.

After the user has customized the document 315 in the manner discussed above, the document is circulated among, or otherwise made available to, the reviewers/signatories designated by the user in the customization process. For example, once the document 315 is ready for review, the user may notify the reviewers/signatories that the document is accessible online via the web signing server 104, electronic signature service 106 and/or other network device. Alternatively, the document may be distributed to the reviewers/signatories via email or other network-distribution method. In any case, the user may further designate a sequence or order in which the reviewers/signatories will be able to access, edit, and/or sign the document 315 to facilitate version control over the document.

The web signing server 104 functions to monitor the progress of the document 315 through the distribution sequence. For example, using techniques described elsewhere herein, elements of the system 100 are operable to determine when a field/tag or other activatable control within the document 315 has been activated (e.g., a field in the document has been edited, the document has been electronically signed and/or initialed, etc.) and by whom the control was activated. Upon determining that a field within the document 315 has been edited, as may be accompanied by an electronic initialing by the party making the edit, the web signing server 104 and/or electronic signature service 106 may notify the other reviewers/signatories that the document has been edited. This notification may be by email or other network-distribution method, and may include a specific indication of the edit made and the identity of the party making the edit. If the document 315 has been edited by a party, the other reviewers/signatories are given the subsequent opportunity to edit the document, even if such reviewers/signatories have previously electronically signed the document indicating their assent to the terms of the document as of the time that they signed the document.

If the document is edited subsequent to a party affixing his/her electronic signature to the document 315, the web signing server 104 and/or electronic signature service 106 may function to electronically remove such signature to afford the party an opportunity to decide anew whether the edited document is to be approved and signed by the party. Alternatively, the party may be requested to ratify his/her signature via a graphical user interface or other electronic manner of indication.

Once the document 315 has been electronically signed by all reviewers/signatories designated by the user, and such electronic signatures have been affixed to the document subsequent to the latest edit to the document, the document is locked so as to prevent further editing. The web signing server 104 and/or electronic signature service 106 may then notify all parties that the document 315 has been finalized.

Figure 4:
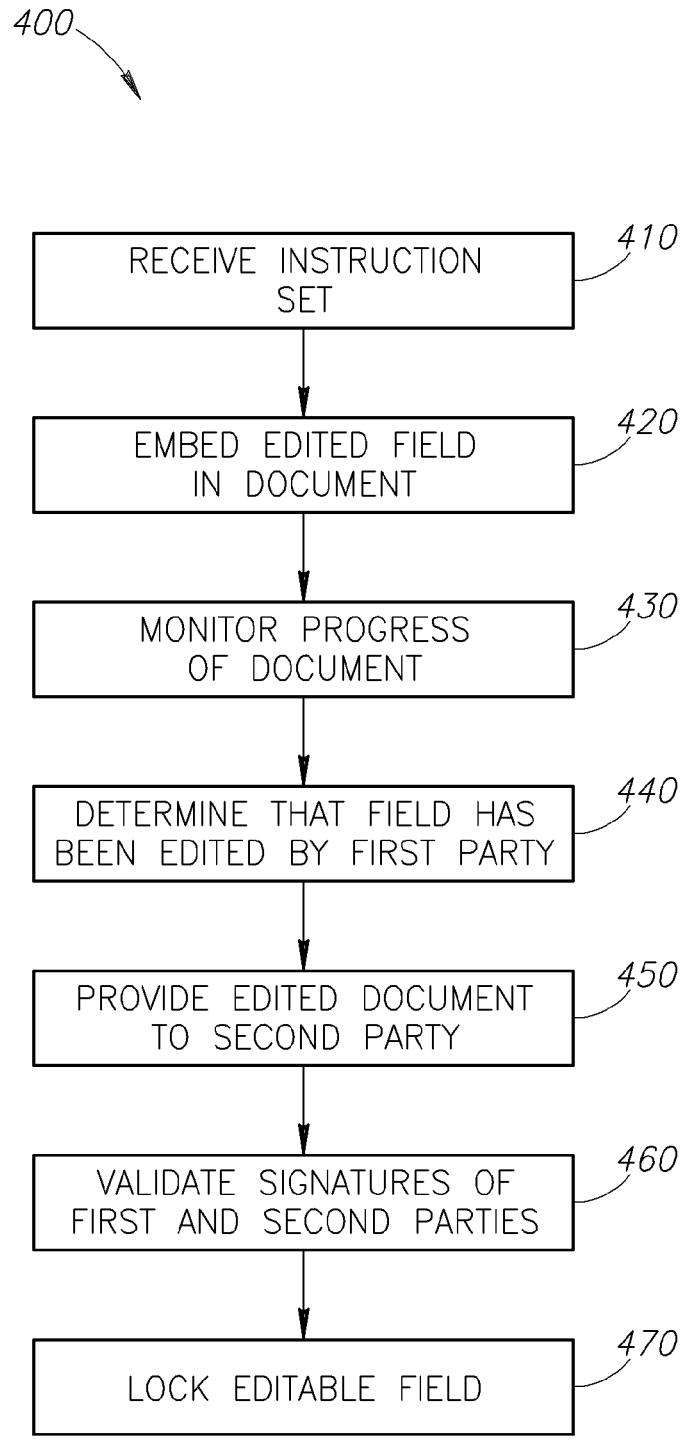
FIG. 4 shows a process for facilitating version control according to an embodiment.

FIG. 4 illustrates a process 400 according to an embodiment of the invention. The process 400 is implementable in an electronic system coupled to or including a storage device. The process 400 is illustrated as a set of operations shown as discrete blocks. The process 400 may be implemented in any suitable hardware, software, firmware, or combination thereof. The order in which the operations are described is not to be necessarily construed as a limitation.

At a block 410, an instruction set is received from a source client. For example, an administrator of web signing server 104 and/or electronic signature service 106 may provide to the computer 101 a web page 300 or other content providing a graphical user interface allowing the user to customize, including establishing rules for, a document for circulation among prospective reviewers/signatories.

At a block 420, based on the instruction set, at least one editable field populated with content is embedded in the electronic document. For example, the page 300 includes a region 310 from which the user may select from among a number of overlay fields/tags (e.g., electronic signature fields 311, electronic initial fields 312, electronically editable data fields 313, etc.) to be embedded into, or otherwise associated with, the electronic document 315.

At a block 430, the progress of the electronic document through a distribution sequence is monitored over a network. For example, the web signing server 104 functions to monitor the progress of the document 315 through the distribution sequence. Elements of the system 100 are operable to determine when a field/tag or other activatable control within the document 315 has been activated (e.g., a field in the document has been edited, the document has been electronically signed and/or initialed, etc.) and by whom the control was activated.

At a block 440, whether the content of the editable field has been edited by a first reviewing party is determined.

At a block 450, in response to determining that the content has been edited by the first reviewing party, the edited electronic document is provided to a second reviewing party. For example, upon determining that a field within the document 315 has been edited, the web signing server 104 and/or electronic signature service 106 may notify the other reviewers/signatories that the document has been edited. If the document 315 has been edited by a party, the other reviewers/signatories are given the subsequent opportunity to edit the document, even if such reviewers/signatories have previously electronically signed the document indicating their assent to the terms of the document as of the time that they signed the document.

At a block 460, that the electronic document has been electronically signed by the first and second reviewing parties is validated.

At a block 470, in response to validating that the electronic document has been electronically signed by the first and second reviewing parties, the editable field is locked from further electronic editing. For example, once the document 315 has been electronically signed by all reviewers/signatories designated by the user, and such electronic signatures have been affixed to the document subsequent to the latest edit to the document, the document is locked by the web signing server 104 and/or electronic signature service 106 so as to prevent further editing.

While the preferred embodiment of the invention has been illustrated and described, as noted above, many changes can be made without departing from the spirit and scope of the invention. Accordingly, the scope of the invention is not limited by the disclosure of the preferred embodiment, but to the invention as described above and illustrated in the exemplars shown below.

The embodiments of the invention in which an exclusive property or privilege is claimed are defined as follows:

1. A method of facilitating version control over an electronic document, the electronic document being subject to a distribution sequence among at least first and second reviewing parties over a network, the method comprising:
   receiving an instruction set from a source client;
   based on the instruction set, embedding in the electronic document at least one editable field populated with content;
   at a signing server, monitoring over the network the progress of the electronic document through the distribution sequence, the distribution sequence designating an order in which the first and second reviewing parties can at least one of access, edit, or sign the electronic document, and whether the electronic document is modifiable by each of the first and second reviewing parties;
   determining that the content of the editable field has been edited, accompanied by an electronic initialing of the edited content of the field by the first reviewing party;
   in response to determining that the content of the editable field has been edited by the first reviewing party and that the document includes a prior signature of the second reviewing party,
   electronically removing from the electronic document the prior signature of the second reviewing party;
   providing, to the second reviewing party, a notification and the edited electronic document, wherein the notification includes a specific indication of the edited content and an identity of the first reviewing party; and
   enabling the second reviewing party to sign the provided electronic document that now includes the edited and initialed content of the field;
   validating that the electronic document has been electronically signed by the first and second reviewing parties; and
   in response to validating that the electronic document has been electronically signed by the first and second reviewing parties, locking the editable field from further electronic editing,
   wherein in response to instructions received from at least one of the first or the second reviewing parties, accessing a signing template that is stored at the signing server, that is distinct from the electronic document, and that specifies: the distribution sequence designating the order in which the first and second reviewing parties can at least one of access, edit, or sign the electronic document.

2. The method of claim 1, wherein validating that the electronic document has been electronically signed by the first and second reviewing parties comprises:
   determining, at a first time, that the second reviewing party has electronically signed the electronic document;
   determining, at a second time subsequent to the first time, that the first reviewing party has edited the content of the editable field and electronically signed the electronic document;
   providing, at a third time subsequent to the second time, the edited electronic document to the second reviewing party for approval of the edited content; and
   receiving from the second reviewing party an indication of approval of the edited content.

3. The method of claim 2, wherein electronically removing the prior signature of the second reviewing party is performed upon determining that the first reviewing party has edited the content, wherein the indication of approval comprises the second reviewing party electronically re-signing the electronic document.

4. The method of claim 2, wherein the indication of approval comprises the second reviewing party providing an electronic instruction to ratify the electronic signature of the second reviewing party.

5. The method of claim 1, wherein the instruction set comprises a restriction on which of the at least first and second reviewing parties are permitted to edit the content.

6. The method of claim 1, wherein the instruction set comprises a designation of which content of the electronic document is to be included in the editable field.

7. The method of claim 1, wherein the signing template further specifies all of: location of signatures and initials for one or more signers; linkage between form fields in the electronic document; and information to be used to notify or authenticate a signer.

8. The method of claim 1, wherein the embedded control is a link back to the signing template stored at the signing server, the signing server configured to authenticate the one of the first and second reviewing parties based on information in the signing template.

9. A system, comprising:
   a source client executable on a first computing device, the source client configured to generate an electronic document, the electronic document being subject to a distribution sequence among at least first and second reviewing parties over a network; and
   second computing device comprising non-transitory storage media and coupled to the first computing device over the network, the second computing device configured to:
   receive an instruction set from the source client;
   based on the instruction set, embed in the electronic document at least one editable field populated with content;
   at a signing server, monitor over the network the progress of the electronic document through the distribution sequence, the distribution sequence designating an order in which the first and second reviewing parties can at least one of access, edit, or sign the electronic document, and whether the electronic document is modifiable by each of the first and second reviewing parties;
   determine that the content of the editable field has been edited, accompanied by an electronic initialing of the edited content of the field by the first reviewing party;

in response to determining that the content of the editable field has been edited by the first reviewing party and that the document includes a prior signature of the second reviewing party, electronically remove from the electronic document the prior signature of the second reviewing party; and provide, to the second reviewing party, a notification and the edited electronic document, wherein the notification includes a specific indication of the edited content and an identity of the first reviewing party; and enable the second reviewing party to sign the provided electronic document that now includes the edited and initialed content of the field;

validate that the electronic document has been electronically signed by the first and second reviewing parties; and in response to validating that the electronic document has been electronically signed by the first and second reviewing parties, lock the editable field from further electronic editing, wherein in response to instructions from at least one of the first or the second reviewing parties, accessing a signing template that is stored at the signing server, that is distinct from the electronic document, and that specifies: the distribution sequence designating the order in which the first and second reviewing parties can at least one of access, edit, or sign the electronic document; and information for deciding on different signature execution processes based on data entered during a signing process.

10. The system of claim 9, wherein validating that the electronic document has been electronically signed by the first and second reviewing parties comprises:

determining, at a first time, that the second reviewing party has electronically signed the electronic document;

determining, at a second time subsequent to the first time, that the first reviewing party has edited the content of the editable field and electronically signed the electronic document;

providing, at a third time subsequent to the second time, the edited electronic document to the second reviewing party for approval of the edited content; and receiving from the second reviewing party an indication of approval of the edited content.

11. The system of claim 10, wherein the prior signature of the second reviewing party is electronically removed upon determining that the first reviewing party has edited the content, wherein the indication of approval comprises the second reviewing party electronically re-signing the electronic document.

12. The system of claim 10, wherein the indication of approval comprises the second reviewing party providing an electronic instruction to ratify the electronic signature of the second reviewing party.

13. The system of claim 9, wherein the instruction set comprises a restriction on which of the at least first and second reviewing parties are permitted to edit the content.

14. The system of claim 9, wherein the instruction set comprises a designation of which content of the electronic document is to be included in the editable field.

15. A non-transitory computer readable medium including instructions that, when executed by an electronic device, enable the electronic device to perform actions that enable facilitating version control over an electronic document, the electronic document being subject to a distribution sequence among at least first and second reviewing parties over a network, the actions comprising:

receiving an instruction set from a source client;

based on the instruction set, embedding in the electronic document at least one editable field populated with content;

at assigning server, monitoring over the network the progress of the electronic document through the distribution sequence, the distribution sequence designating an order in which the first and second reviewing parties can at least one of access, edit, or sign the electronic document, and whether the electronic document is modifiable by each of the first and second reviewing parties;

determining that the content of the editable field has been edited, accompanied by an electronic initialing of the edited content of the field by the first reviewing party;

in response to determining that the content of the editable field has been edited by the first reviewing party and that the document includes a prior signature of the second reviewing party, electronically removing from the electronic document the prior signature of the second reviewing party;

providing, to the second reviewing party, a notification and the edited electronic document, wherein the notification includes a specific indication of the edited content and an identity of the first reviewing party; and enabling the second reviewing party to sign the provided electronic document that now includes the edited and initialed content of the field;

validating that the electronic document has been electronically signed by the first and second reviewing parties; and in response to validating that the electronic document has been electronically signed by the first and second reviewing parties, locking the editable field from further electronic editing, wherein in response to instructions received from at least one of the first or the second reviewing parties, accessing a signing template that is stored at the signing server, that is distinct from the electronic document, and that specifies: the distribution sequence designating the order in which the first and second reviewing parties can at least one of access, edit, or sign the electronic document; and information for deciding on different signature execution processes based on data entered during a signing process.

16. The non-transitory computer readable medium of claim 15, wherein validating that the electronic document has been electronically signed by the first and second reviewing parties comprises:

determining, at a first time, that the second reviewing party has electronically signed the electronic document;

determining, at a second time subsequent to the first time, that the first reviewing party has edited the content of the editable field and electronically signed the electronic document;

providing, at a third time subsequent to the second time, the edited electronic document to the second reviewing party for approval of the edited content; and receiving from the second reviewing party an indication of approval of the edited content.

17. The non-transitory computer readable medium of claim 16, wherein electronically removing the prior signature of the second reviewing party is performed upon determining that the first reviewing party has edited the content, wherein the indication of approval comprises the second reviewing party electronically re-signing the electronic document.

18. The non-transitory computer readable medium of claim 16, wherein the indication of approval comprises the second reviewing party providing an electronic instruction to ratify the electronic signature of the second reviewing party.

19. The non-transitory computer readable medium of claim 15, wherein the instruction set comprises a designation of which content of the electronic document is to be included in the editable field.

\* \* \* \* \*